E. KÖPKE.
FLUE SCRAPER.
APPLICATION FILED FEB. 12, 1913.
1,172,368.
Patented Feb. 22, 1916.
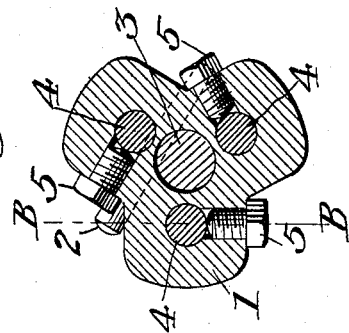
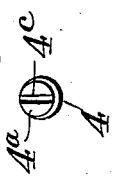
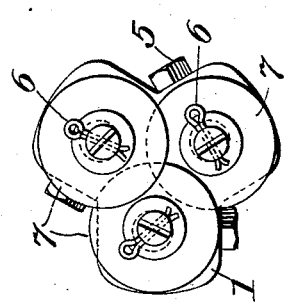
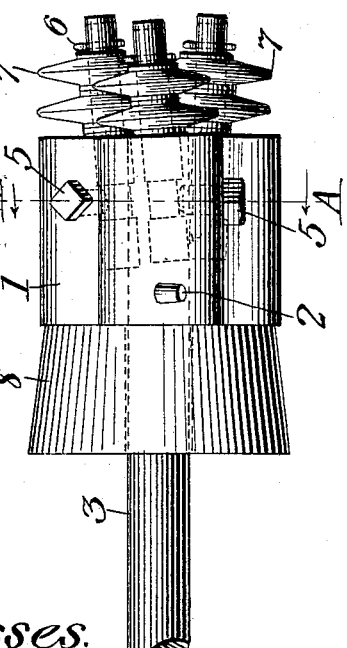
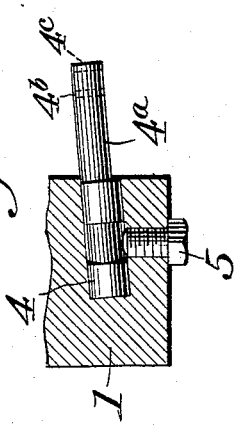
Witnesses.
N. W. Edelin.
V. J. Houghton.
Inventor.
Ernst Köpke
by
Homer Goldsborough & Wall
Attys

UNITED STATES PATENT OFFICE.

ERNST KÖPKE, OF HONOLULU, TERRITORY OF HAWAII.

FLUE-SCRAPER.

1,172,368.

Specification of Letters Patent.

Patented Feb. 22, 1916.

Application filed February 12, 1913. Serial No. 747,947.

*To all whom it may concern:*

Be it known that I, ERNST KÖPKE, a citizen of the United States, residing at Honolulu, county of Honolulu, Territory of Hawaii, have invented certain new and useful Improvements in Flue-Scrapers; and I do hereby declare the following to be a full, clear, and exact description of the invention, such as will enable others skilled in the art to which it appertains to make and use the same.

This invention relates to flue-scrapers or tools for loosening the scale or incrustation deposited on the inner walls of tubes.

The object of the present invention is to produce a tool of this character particularly applicable to the tubes of calandrias of evaporators, vacuum pans and the like, and which will accomplish the desired result in a rapid and efficient manner without damage to the tubes.

A flue-scraper of this type is shown in Patent #1,035,363 issued to me Aug. 13, 1912, which gives satisfactory results. Its construction, however, does not permit of its use in tubes of small diameter, for the hinged bars carrying the cutting wheels cannot be brought close enough together for this purpose without so weakening the body as to lose its rigidity.

My present invention contemplates a body with preferably three pins secured therein, and two V-shaped wheels axled on the end of each pin. The tool is adapted either to be turned by hand or to be revolved by power within the tube from which it is desired to remove the scale. The pins are secured by set screws in holes drilled in the body, preferably drilled at a slight inclination to the axis of said body, so as to cause the wheels to describe spiral paths on the inner surface of the tube when the tool is revolved, the wheels thus cutting threads in the hard scale and causing the same to part from the tube, leaving the tube practically clean. The portion of each pin projecting from the body, on which the V-shaped wheels are axled, is made eccentric to that portion which is within the hole in the body. Cotters are provided in the pins to prevent the wheels from coming off when the tool is in operation. The outer end of each pin is provided with a slot, so that upon loosening the set screw in the body, the pin may be turned in the hole in the body by means of a screw driver. The position of the wheels with respect to their distance from the center or axis of the body may thus be adjusted, owing to the eccentricity of the pins, so as to bring the wheels just tangent to the inner circumference of the tube to be cleaned.

In the accompanying drawings, forming a part of this specification, is shown a flue-scraper embodying my present invention, in which—

Figure 1 is an elevation of the flue-scraper. Fig. 2 is a view of the cutting end. Fig. 3 is a sectional view on the line A—A of Fig. 1. Fig. 4 is a sectional view on the line B—B of Fig. 3. Fig. 5 is a view of the end of a pin at right angles to that shown in Fig. 4. Fig. 6 is an end view of a pin.

Referring to the drawings, the body 1 is preferably shaped as shown and secured by a taper pin 2 to the end of a bar 3 by which the tool is revolved and passed through the tube to be cleaned. Three holes are drilled in the body 1 at a slight inclination to its axis to receive the pins 4 which are clamped therein by the set screws 5. Each pin is so inclined with respect to the longitudinal axis of the body 1 that a common plane cannot be passed through the axis of the body portion and the pin. The portion $4^a$ of each pin 4 which projects from the body 1 is turned slightly smaller in diameter than the portion within the body 1 and is made eccentric to the portion within the body 1, as shown in Figs. 4 and 6. A hole $4^b$ for a cotter 6 is provided near the end of the portion $4^a$, Figs. 4 and 5. The outer end is provided with a slot $4^c$ as shown. Two V-shaped wheels 7 are axled on the ends $4^a$ of each pin 4 between the cotter 6 and the body 1, Figs. 1 and 2. The operating bar 3 may be provided with a ring or loose collar 8 having a tapered periphery adapted to fit in the end of the tube being cleaned to guide the bar 3 and keep it concentric with said tube.

I claim:—

A flue scraper comprising a body portion, wheel supporting pins set in said body portion, each pin provided with an eccentric outer end projecting beyond said body portion, cutting wheels mounted on said eccentric outer ends, said pins adapted to be turned in said body portion to adjust said wheels, and means to clamp said pins in the body portion.

In testimony whereof I affix my signature, in presence of two witnesses.

ERNST KÖPKE.

Witnesses:
Thos. R. W. Gray,
F. C. Cleghorn.

Copies of this patent may be obtained for five cents each, by addressing the "Commissioner of Patents, Washington, D. C."